Oct. 24, 1939.   A. F. JOHNSON   2,177,128
HOSE SUPPORT
Filed March 27, 1937
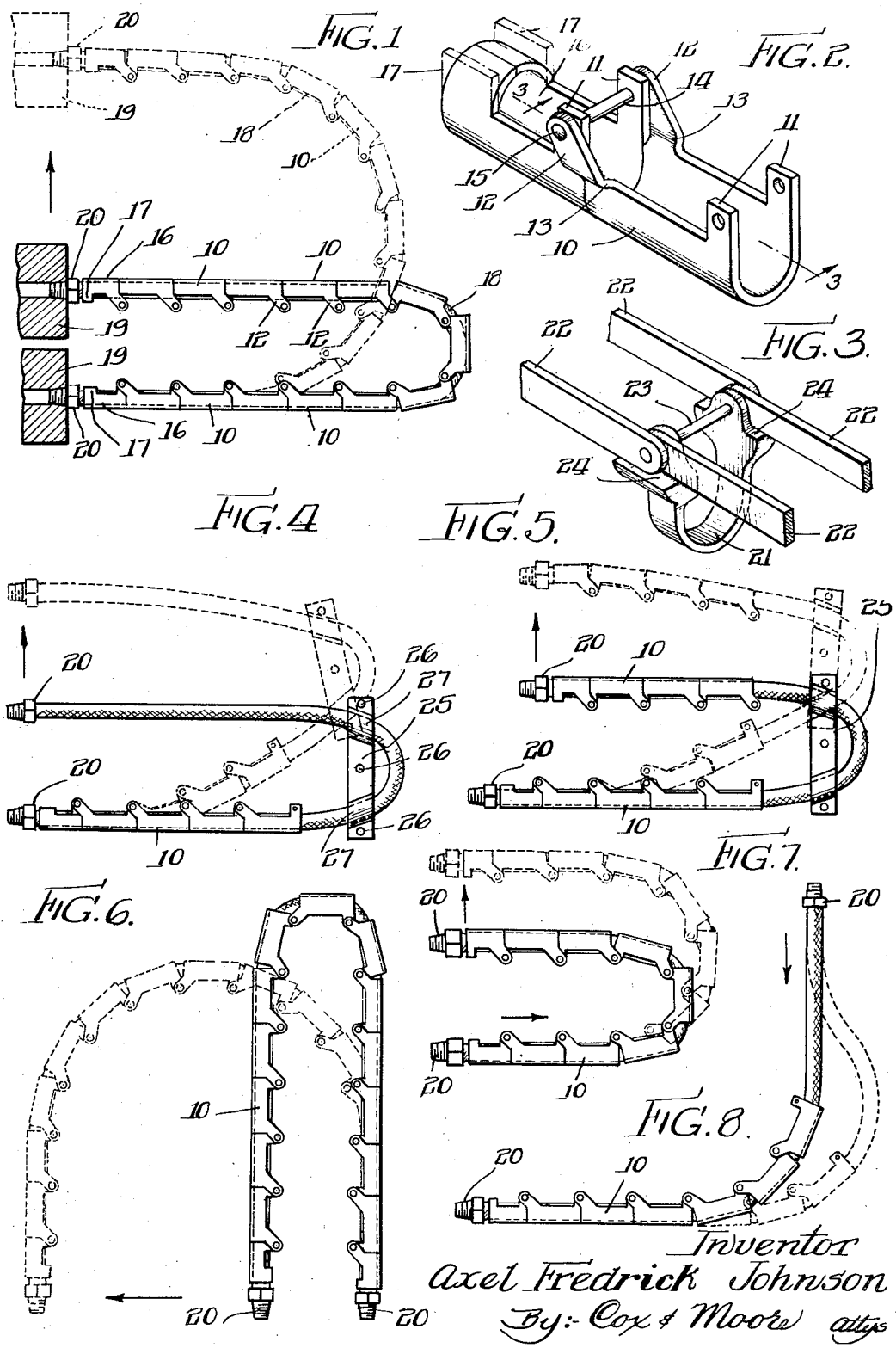
Inventor
Axel Fredrick Johnson
By: Cox & Moore attys Patented Oct. 24, 1939

2,177,128

UNITED STATES PATENT OFFICE 2,177,128

HOSE SUPPORT

Axel Fredrick Johnson, Chicago, Ill., assignor to Chicago Metal Hose Corporation, Maywood, Ill., a corporation of Illinois Application March 27, 1937, Serial No. 133,409

6 Claims. (Cl. 138—61)

This invention relates to hose supports, and more particularly to supports of the type adapted to hold and guide flexible hose or tubing during movement or flexure.

It is an object of the invention to provide a hose support, particularly for flexible hose, tubing, or the like, which will effectively hold the hose in any desired position and effectively guide it during its operative movement or flexure, whereby to distribute the flexing strains along the length of the hose and insure the proper draining thereof. This decreases wear and deterioration, and insures a maximum length of life to the hose.

It is a further object of the invention to provide a hose support, particularly for flexible hose or tubing, which is of substantially universal application in that it may be applied to various types of installations, installations wherein the hose or tubing parts may be variously arranged and subjected to various types of movement.

Still another object of the invention is to provide a support for flexible hose or tubing which is of low cost, which may be readily applied to the hose or tubing, and which will be durable and effective in operation.

Still other objects and advantages of the invention will be apparent from the following specification when taken with the accompanying drawing, wherein certain preferred embodiments of the invention are illustrated.

In the drawing, wherein like reference numerals refer to like parts throughout:

Fig. 1 is a side view showing the support applied to a piece of flexible hose or tubing, in accordance with one preferred embodiment of the invention.

Fig. 2 is a detail perspective view showing the links of which the hose support is composed, and the method of securing the links in cooperating relation.

Fig. 3 is a perspective view illustrating an alternate form of link construction.

Figs. 4 to 8 inclusive are views illustrating the manner in which the hose support of the present invention may be applied to various types of flexible hose or tubing installations.

Referring first to Figs. 1 and 2, the hose support comprises a series of pivoted links 10 adapted to embrace the hose along the length thereof in the manner illustrated in Fig. 1. Each link has at the forward end thereof a pair of upstanding projections or ears 11, and at the rear end thereof a pair of angularly disposed ears or projections 12. The projections 12 are offset outwardly as indicated at 13 so that they lie outwardly of the projections 11. In assembling the links, the rear projections 12 of one link are arranged to embrace the forward projections of an adjacent link, as indicated in Fig. 2, and a pivot pin 14 is passed through the assembly to hold the links together. The projections are all suitably perforated for the reception of the pivot pin, and the pin may be secured against accidental withdrawal after being mounted in assembled position by heading over the ends 15 thereof, or by other suitable means. The links may be readily and cheaply formed by stamping and shaping them from sheet metal, or they may be cast, if this is deemed desirable in installations for large size or heavy hose.

The end links 16 are formed at their rear end portions with a pair of projections 17 which may be bent as indicated in full lines in Fig. 2 into tight gripping engagement with the hose or any suitable coupling member secured thereto. Each link is in the form of a cradle and is adapted to embrace the body of the hose.

In Fig. 1 the hose support is illustrated as being applied to a piece of hose 18 which may be any form of flexible hose or tubing. The hose is secured to a pair of relatively movable blocks or members 19 by means of couplings 20. The blocks 19 may be the die blocks of a molding press or the like, as the hose support of the present invention is particularly adapted for use in such installations. However, it is to be understood that the support is of general application and may be applied to flexible hose or tubing in various installations and be used for various purposes. In applying the hose support to the hose, the links may be applied individually and assembled upon the hose, or they may be previously assembled and applied to the hose as a collective support unit, as may be desired and depending upon the requirements of any particular installation. In using the latter method of assembly the previously connected links are merely slipped longitudinally of the hose from one end thereof, after which the projections 17 of the end links 16 are bent into gripping engagement with the coupling members thereon as shown. If it is inconvenient to remove the hose or render either end free, the links may be individually applied to the hose and assembled thereon by means of the pivot pins 14. The end links 16 may be so selected or cut in length as to render the hose support of the proper over-all length for the particular installation.

The support links, when assembled and arranged in a straight line, have their ends in abutting relation. By this means the links are prevented from reverse bending in one direction past a straight line position, but are free to bend in the other direction to any desired degree. It will be seen that as the upper block 19 of the molding press moves from its full line to its dotted line position in Fig. 1, the supporting links pivot on their pivot pins 14 to allow unimpeded movement to the hose. However, the support links will at all times prevent any reverse bending of the hose. The formation of any pockets or sag points in the hose in which liquid might accumulate is thus prevented, and the hose will at all times drain properly. The support causes a distribution of the hose bending along an appreciable length thereof. This prevents localized flexure and increases the life of the hose. The support also insures that the hose will bend only in one plane, thus preventing twisting of the material fibers and further insuring a long hose life.

In Fig. 3 there is illustrated a different form of hose support structure. In this instance the structure is composed of a series of main support links 21 which are of general U-shape and are adapted to support the hose at spaced intervals as in the embodiment of the invention previously described. The main links are held in properly spaced relation by a series of auxiliary or connecting links 22 which are secured to the main links by means of pivot pins 23. Each main link is provided with a pair of table portions 24 which are adapted to engage the connecting links 22 when the structure is brought into the straight line position shown in Fig. 3, thus preventing the link structure from reverse bending. The manner of application to the hose and the operation of this form of construction is substantially similar to that previously described. It is obvious that various forms of support links may be fabricated without departing from the spirit of the invention.

The hose support of the invention is readily adaptable to a wide variety of installations as is indicated in Figs. 4 to 8 inclusive. In Fig. 4 the link support structure is shown applied to only a part of the hose along the lower portion thereof. Such an arrangement decreases the cost of the support structure in that a fewer number of links is required. At the same time the relatively few links provided will effectively prevent the formation of liquid pockets in the hose and will insure controlled hose flexure and distribution of the flexing strains. For many installations the shorter support structure of Fig. 4 will be sufficient. In this embodiment of the invention the sharply bent mid-portion of the hose is clamped within a clamping member 25 which may comprise a pair of sheet metal plate members secured together by bolts 26 and provided with passageways 27 for the reception of the hose body. The use of such a clamping member may be desirable in installations wherein the ends 20 of the hose are adapted in certain positions to be brought relatively close together.

In Fig. 5 the support links are applied to hose sections adjacent each end thereof, the sharply bent portion of the hose being free of the links but being clamped within a clamping member 25. It is to be understood that this clamping member may or may not be used, as desired. In this embodiment the ends 20 of the hose are not in vertical alinement, but are offset with respect to each other.

The embodiment illustrated in Fig. 6 is generally similar to that shown in Fig. 1, except that in this instance the bight of the hose is vertically disposed and the ends 20 are adapted for relative horizontal movement. In such an installation the support links will maintain the hose in upright position, to prevent the formation of any liquid pockets, insure flexure only in a single vertical plane, and provide for a distribution of all flexing strains.

In Fig. 7 the hose support is illustrated as applied to a hose installation wherein one end of the hose is subjected to horizontal displacement and the other end of the hose is subjected to vertical displacement.

In Fig. 8 the supporting links are shown applied to the lower portion only of a hose wherein the hose ends are displaced only 90 degrees and one end of the hose is adapted for longitudinal movement.

It is thus apparent that the hose support of the present invention is of substantially universal application and may be applied to various types of installations wherein the hose ends are variously disposed and the hose parts are subjected to various types of movement. In installations where it is unnecessary to provide supporting links along the entire length of the hose, the links may be arranged at strategic points. The same type of supporting link may be used with various installations, it being necessary to accommodate the link merely to the hose diameter.

It is obvious that various changes may be made in the embodiments which have been described for purposes of illustration, without departing from the spirit of the invention. The invention is accordingly not to be limited to the precise embodiments shown and described, but only as indicated in the following claims.

The invention is hereby claimed as follows:

1. In a hose support, a plurality of supporting links adapted to be arranged in juxtaposition longitudinally of a flexible hose and to be secured to the hose for movement therewith, means for pivotally connecting the links so as to provide for relative movement between the links in one plane only, and abutment means carried by the links adapted to be brought into engagement as the links are moved within said plane of movement whereby to limit the pivotal movement of the links in one direction, said links being freely pivotally movable in the opposite direction, and said pivotal connecting means comprising a series of pivot pins disposed laterally of the body of the hose and serving to secure the links to the hose.

2. In a hose support, a series of cradle link members adapted to be arranged in juxtaposition longitudinally of a flexible hose, lateral projections provided at each end of the links, means for pivotally securing the projections of one link to the adjacent projections of an adjoining link whereby to provide an elongated trough-like hose support structure movable in one plane only, said pivotal securing means serving to secure the hose within said structure, said links being adapted to be brought into engagement to limit their relative pivotal movement in one direction at substantially the straight-line position.

3. A hose assembly comprising a flexible hose, a plurality of trough-shaped support members embracing the hose at spaced intervals longitudinally thereof and constrained for movement therewith, and means for pivotally connecting the support members to form an elongated hose trough, said members being free to pivot with respect to each other in one direction through at least 90 degrees but being limited in their relative pivotal movement in the opposite direction.

4. A hose assembly comprising a flexible hose, a plurality of members embracing the hose at spaced intervals longitudinally thereof, link members, means pivotally connecting said link members to the first named members and adapted to hold the latter in spaced relation, said pivotal connecting means serving to secure said first named members to the hose and being arranged to provide for relative pivotal movement of the link members in one plane only, and abutment means on said first named members for limiting the bending movement of the assembly in one direction within said plane of movement.

5. In a hose support, a series of cradle link members adapted to be arranged in juxtaposition longitudinally of a flexible hose, projections provided at each end of the links, means for pivotally securing the projections of one link to the adjacent projections of an adjoining link whereby to provide an elongated trough-like hose support structure movable in one plane only, and means for securing the hose within said structure, said links being adapted to be brought into engagement to limit their relative pivotal movement in one direction.

6. A hose assembly comprising a flexible hose, a plurality of trough-shaped support members embracing the hose at spaced intervals longitudinally thereof and constrained for movement therewith, and means including lateral projections for pivotally connecting the support members to form an elongated hose trough, said members being free to pivot with respect to each other in one direction through at least about 90 degrees but being limited in their relative pivotal movement in the opposite direction at substantially the straight line position.

AXEL FREDRICK JOHNSON.